United States Patent
Jeong et al.

(10) Patent No.: US 6,796,178 B2
(45) Date of Patent: Sep. 28, 2004

(54) ROTATION-TYPE DECOUPLED MEMS GYROSCOPE

(75) Inventors: Hee-moon Jeong, Yongin (KR); Jun-o Kim, Yongin (KR); Byeung-leul Lee, Yongin (KR); Sang-woo Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/359,272

(22) Filed: Feb. 6, 2003

(65) Prior Publication Data

US 2003/0164041 A1 Sep. 4, 2003

(30) Foreign Application Priority Data

Feb. 8, 2002 (KR) .......................................... 2002-07244

(51) Int. Cl.[7] ................................................. G01P 9/04
(52) U.S. Cl. .................................. 73/504.02; 73/504.12
(58) Field of Search ........................ 73/504.12, 504.04, 73/504.02, 504.13, 504.14, 504.08, 504.09

(56) References Cited

U.S. PATENT DOCUMENTS

| 5,955,668 A | 9/1999 | Hsu |
| 6,067,858 A | 5/2000 | Clark et al. |
| 6,122,961 A | 9/2000 | Geen et al. |
| 6,240,780 B1 | 6/2001 | Negoro et al. |
| 6,250,157 B1 | 6/2001 | Touge |
| 6,349,597 B1 * | 2/2002 | Folkmer et al. ......... 73/504.02 |
| 6,415,663 B1 * | 7/2002 | Mochida et al. ......... 73/504.12 |
| 6,516,666 B1 * | 2/2003 | Li ............................ 73/504.12 |
| 6,526,826 B2 * | 3/2003 | Kurachi et al. .......... 73/504.02 |

FOREIGN PATENT DOCUMENTS

| WO | WO 01 20259 | 3/2001 |
| WO | 01/20259 A1 | 3/2001 |

* cited by examiner

*Primary Examiner*—Helen Kwok
(74) *Attorney, Agent, or Firm*—Lee & Sterba, P.C.

(57) ABSTRACT

A rotation-type decoupled MEMS gyroscope including a drive body movable about the X-axis, a sensing body movable about the Z-axis, a medium body moving together with the drive body about the X-axis and the sensing body about the Z-axis. The drive body is fixed on a substrate by a first torsion spring torsion-deformed about the X-axis, and the medium body is connected to the drive body by a first bending spring bending-deformed about the Z-axis. The sensing body is connected to the medium body by a second torsion spring torsion-deformed about the X-axis and fixed to the substrate by a second bending spring bending-deformed about the Z-axis. If angular velocity is applied relative to the Y-axis while the drive body vibrates in a certain range about the X-axis by a driving electrode, the sensing body rotates about the Z-axis by the Coriolis force and a sensing electrode senses the rotation.

14 Claims, 11 Drawing Sheets

ROTATION-TYPE DECOUPLED MEMS GYROSCOPE

BACKGROUND OF THE INVENTION

1. Field of the Invention

The present invention relates to a MEMS gyroscope. More particularly, the present invention relates to a rotation-type decoupled MEMS gyroscope that allows mutually independent motion of a drive body and a sensing body.

2. Description of the Related Art

Micro Electro Mechanical System (MEMS) is a technology embodying the fabrication of mechanical and electrical elements using semiconductor processing. A gyroscope for measuring angular velocity is an example of a device that may incorporate MEMS technology. A gyroscope is able to measure an angular velocity by measuring the Coriolis force that occurs when an angular velocity is applied to an object moving at a certain velocity. The Coriolis force is proportional to the cross product of the moving velocity and the angular velocity due to an external force. In order for the gyroscope to generate and sense the Coriolis force, the gyroscope has a mass body vibrating therein.

FIG. 1 illustrates a view for schematically viewing a MEMS gyroscope, in particular, a rotation-type gyroscope. A driving direction (A), an input direction (Ω), and a sensing direction (S) are set in space in directions perpendicular to one another. Generally, in a gyroscope using MEMS technology, three coordinate axes are established. The first two axes, an X-axis and a Y-axis are parallel to a surface of the substrate and perpendicular to each other. The third axis, a Z-axis, is normal to the surface of the substrate. In FIG. 1, the driving direction (A) is set in the direction of the X-axis direction, the input direction (Ω) is set in the direction of the Y-axis, and the sensing direction (S) is set in the direction of the Z-axis.

The mass body ("body") is rotatably mounted about the X-axis, and is driven to move about the X-axis by a driving electrode (not shown). If an angular velocity is applied in the rotation direction about the Y-axis while the body moves, the Coriolis force in the rotation direction about the Z-axis is applied. When the force causes the body to rotate in the Z-axis, a sensing electrode (not shown) measures a displacement rotated, so the magnitude of the angular velocity may be calculated.

FIG. 1 shows, for the convenience of the following description, an example in which one body carries out all of the functions of the drive body, driven by the driving electrode, the sensing body, moving by the Coriolis force, and the sensing by the sensing electrode. Recently, the drive body and the sensing body have been manufactured separately, thus resulting in a gyroscope called a decoupled gyroscope. An advantage of a decoupled gyroscope is that it avoids a problem of driving the drive body using resonance while moving the sensing body nearly at a resonance frequency of the driving body.

Some conventional decoupled gyroscopes, however, may have only the drive body in a decoupled structure or only the sensing body in the decoupled structure, rather than completely separating the drive body and the sensing body. In a case where only the drive body is in the decoupled structure, the drive body performs only the driven motions and the sensing body performs all of the driven motions and the sensed motions. Accordingly, a problem occurs in that the sensed motions of the sensing body appear together with the driven motions.

On the contrary, in a case where only the sensing body is in the decoupled structure, the drive body performs all the driven motions and the sensed motions and the sensing body performs only the sensed motions. Accordingly, a problem occurs in that the driven motions of the drive body may affect a direction in which the Coriolis force is applied.

Some conventional gyroscopes are able to measure only the angular velocity inputted about the Z-axis being normal to the substrate, which causes a problem in that a two-axis angular velocity is not able to be measured on one plane. Accordingly, in a case of manufacturing a gyroscope for sensing a multi-axis angular velocity, an additional assembly process for vertically arranging devices is required.

In order to measure an input angular velocity relative to the axes of the horizontal directions, i.e., the X-axis or the Y-axis, the driving electrode must be equipped for vertically driving the body or the sensing electrode must be equipped for sensing a vertical displacement of the body. In order to manufacture the driving electrode or the sensing electrode having the above-described vertical direction, a fixed electrode, which is fixed to the substrate, and a moving electrode, which is spaced apart from the fixed electrode and positioned at an upper portion of the fixed electrode, have been previously manufactured. In a case where such an electrode is used as a driving electrode, the moving electrode is driven by applying a varying voltage between the moving electrode and the fixed electrode. In a case where such an electrode is used as a sensing electrode, an angular velocity is measured by sensing an electrostatic force varying with respect to a distance between the fixed electrode and the moving electrode.

An electrode having a structure as described above has a drawback in the difficulty of the manufacture thereof since the moving electrode is positioned at an upper portion of the fixed electrode. Consequently, the moving electrode is first formed to have a stacked structure on the upper portion of the fixed electrode. That is, in order to manufacture the aforementioned electrode, a multi-step process must be performed. First, the fixed electrode is formed on the substrate. Then, a sacrificial layer is deposited on the fixed electrode. Subsequently, the moving electrode is formed on the sacrificial layer, and then the sacrificial layer is removed. As mentioned above, several process steps must be performed to form a moving electrode floating over a fixed electrode.

Further, in order to measure precisely a displacement of the moving electrode in a vertical direction, a distance between the moving electrode and the fixed electrode should be small. Accordingly, a problem exists in that an adherence phenomenon may occur between the moving electrode and the fixed electrode.

Referring back to FIG. 1, there is shown a gyroscope for sensing an angular velocity applied to one arbitrary axis existing on a surface of a substrate. In this example, the drive body moves relative to one arbitrary axis of the substrate, for example, the X-axis, using a levitation force, so that a sensing motion rotating about the Z-axis normal to the surface of the substrate is generated.

However, such a gyroscope has a problem in that space consumption increases due to a ring-type structure and a circular arrangement of electrodes for rotational motions. Accordingly, in a case of manufacturing a plurality of gyroscopes on a single wafer, wasted space occurs where parts for gyroscopes are not mounted, thereby decreasing the number of gyroscopes to be manufactured on a unit area wafer.

Further, such a conventional gyroscope has a structure wherein the sensing electrodes for sensing the rotation of the sensing body are arranged in a radial direction, which creates a problem in that a distance between the moving electrode and the fixed electrode increases. Since the distance between the moving electrode and the fixed electrode inside the sensing electrode must be small, as well as uniform, for precise sensing, the increase in the distance between the moving electrode and the fixed electrode causes a deterioration in sensing performance.

SUMMARY OF THE INVENTION

It is a feature of an embodiment of the present invention to provide a rotation-type MEMS gyroscope capable of enhancing sensing of an angular velocity and having both the drive body and the sensing body having a decoupled structure.

It is another feature of an embodiment of the present invention to provide a rotation-type MEMS gyroscope being easily driven in a vertical direction, having a simplified manufacture process, and requiring decreased space consumption.

It is yet another feature of an embodiment of the present invention to provide a rotation-type MEMS gyroscope with an enhanced sensing performance of the sensing electrode and having a uniform distance between the moving electrode and the fixed electrode of the sensing electrode.

In order to provide the above features, a MEMS gyroscope according to an embodiment of the present invention includes a drive body disposed on a substrate to be movable about a first axis, the first axis being a rotation axis line parallel to a surface of the substrate; a sensing body disposed on the substrate to be movable about a second axis, the second axis being a rotation axis line normal to the surface of the substrate; a medium body disposed on the substrate, the medium body being capable of moving together with the drive body about the first axis and moving together with the sensing body about the second axis; a driving electrode for driving the drive body in order for the drive body to vibrate in a certain range about the first axis; and a sensing electrode for measuring a displacement of the sensing body rotating about the second axis by a Coriolis force generated by an application of an angular velocity while the drive body vibrates by the driving electrode.

Preferably, the MEMS gyroscope according to an embodiment of the present invention further includes a first torsion spring for fixing the drive body to the substrate, the first torsion spring being torsion-deformed in order for the drive body to rotate relative to the substrate about the first axis; a first bending spring for fixing the medium body to the drive body, the first bending spring being bending-deformed in order for the medium body to rotate relative to the drive body about the second axis; a second torsion spring for fixing the medium body to the sensing body, the second torsion spring being torsion-deformed in order for the medium body to rotate relative to the sensing body about the first axis; and a second bending spring for fixing the sensing body to the substrate, the second bending spring being bending-deformed in order for the sensing body to rotate relative to the substrate about the second axis.

Preferably, at least either the first torsion spring or the second torsion spring includes a pair of plate-shaped beams disposed parallel to each other; and a plurality of connection parts connecting the beams.

Also preferably, the second torsion spring includes a first beam for being torsion-deformed with respect to the first axis; and a second beam vertically connected to both ends of the first beam, for being torsion-deformed with respect to a third axis, the third axis being a rotation axis parallel to the surface of the substrate and perpendicular to the first axis.

Preferably, at least either of the first bending spring or the second bending spring includes a plurality of plate-shaped beams fixed to one another at a portion thereof.

Preferably, the driving electrode is formed in a comb structure and includes a fixed electrode having a plurality of fixing walls vertically disposed on the substrate, formed in parallel to one another, and fixed to the substrate; and a moving electrode disposed between two of the plurality of fixing walls, having a plurality of moving walls having a height less than a height of the plurality of fixing walls from the substrate, the moving electrode being connected to the drive body.

The sensing electrode preferably includes a fixed electrode connected to the substrate and having zigzag-shaped sides; and a moving electrode connected to the sensing body and having a zigzag shape corresponding to the shape of the sides of the fixed electrode.

Preferably, the drive body and the medium body have a substantially rectangular frame shape and the sensing body has a ring shape. Also preferably, the medium body is disposed in a space inside the drive body, and the sensing body is disposed in a space inside the medium body.

A plurality of etching holes may be formed in the drive body, medium body, and sensing body. The fixed electrode of the sensing electrode, the first torsion spring, and the first bending spring may be connected by a common electrode pad and may be electrically grounded.

According to an embodiment of the present invention, the medium body moves but the sensing body remains motionless while the drive body moves, and the sensing body rotates if the medium body rotates when the Coriolis force occurs. Accordingly, both the drive body and the sensing body have a decoupled structure, thereby enhancing the angular sensing performance of the gyroscope.

BRIEF DESCRIPTION OF THE DRAWINGS

The above and other features and advantages of the present invention will become readily apparent to those of ordinary skill in the art by the following detailed description of preferred embodiments thereof with reference to the attached drawings in which.

DETAILED DESCRIPTION OF THE INVENTION

Korean Patent Application No. 2002-07244, filed Feb. 8, 2002, and entitled: "Rotation-Type Decoupled MEMS Gyroscope," is incorporated by reference herein in its entirety.

Hereinafter, the present invention will be described in more detail with reference to the accompanying drawings. In the description below, the horizontal direction parallel to the surface of the substrate is called the X-axis, the direction parallel to the surface of the substrate and perpendicular to the X-axis is called the Y-axis, and the direction normal to the surface of the substrate is called the Z-axis.

Figure 1:
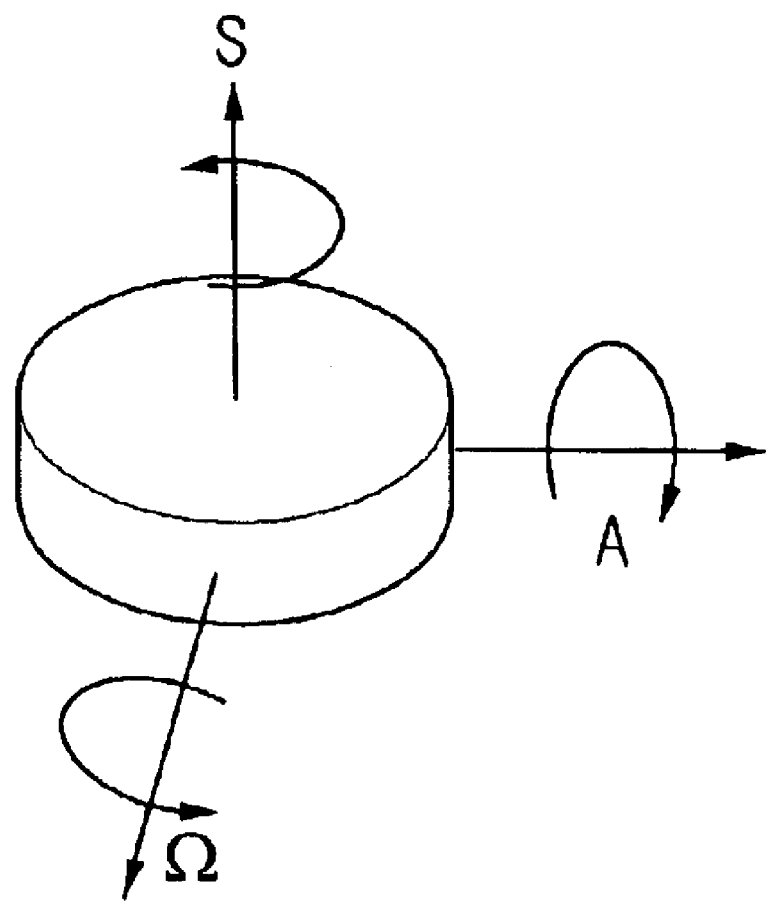
FIG. 1 illustrates a view schematically showing an example of a conventional rotation-type MEMS gyroscope.
Figure 2:
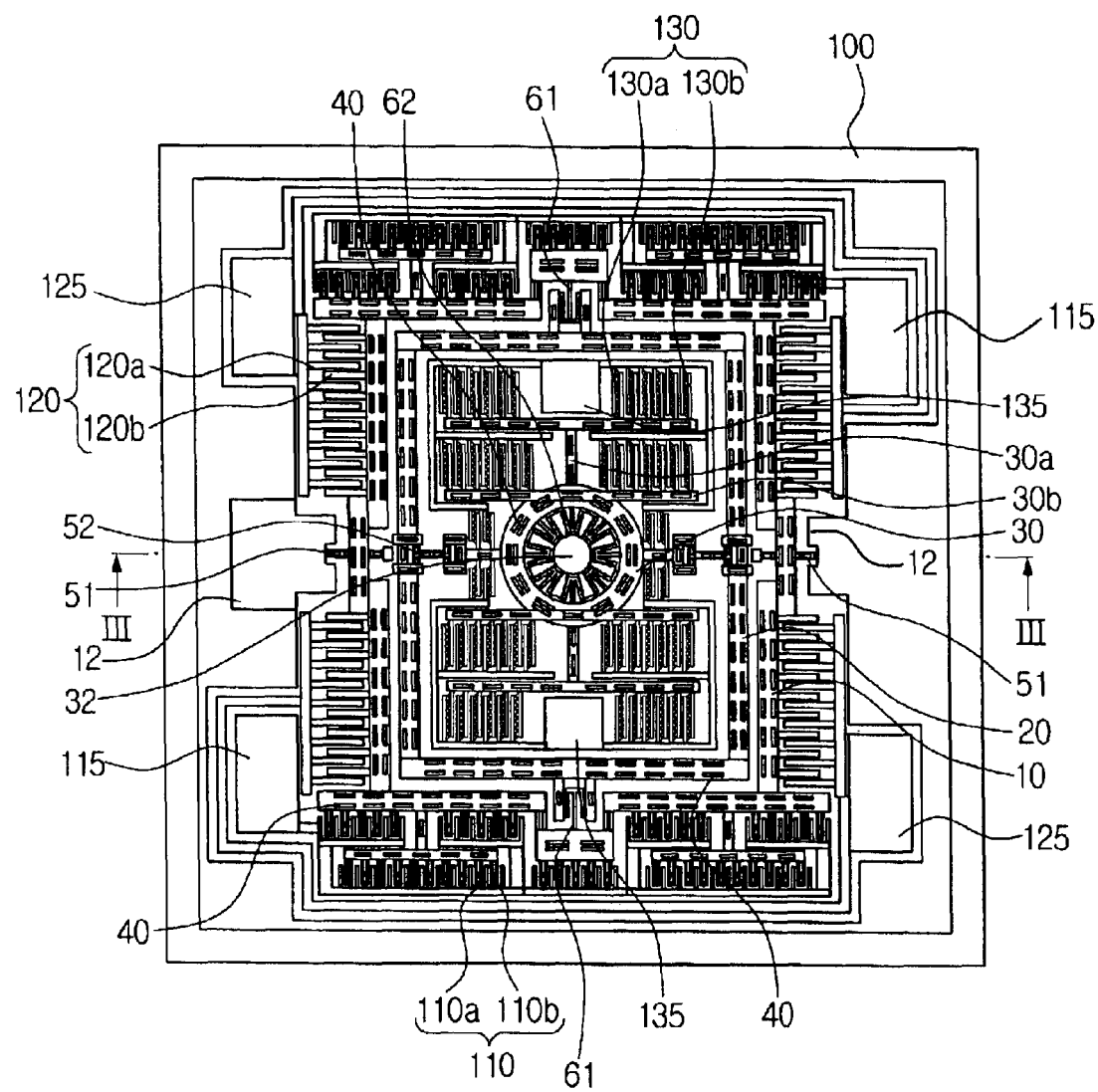
FIG. 2 illustrates a view showing a rotation-type MEMS gyroscope according to a preferred embodiment of the present invention.
Figure 3:
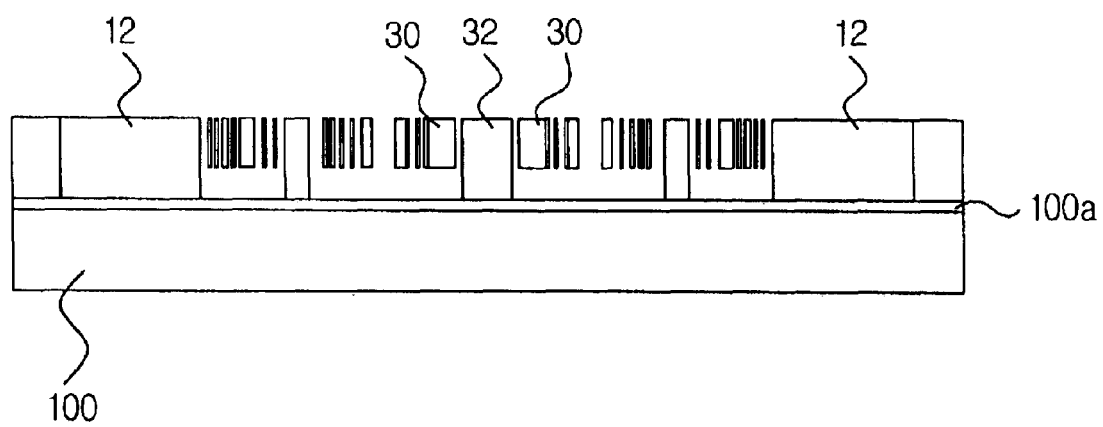
FIG. 3 illustrates a cross-sectional view of FIG. 2 taken along section line III—III.
Figure 4:
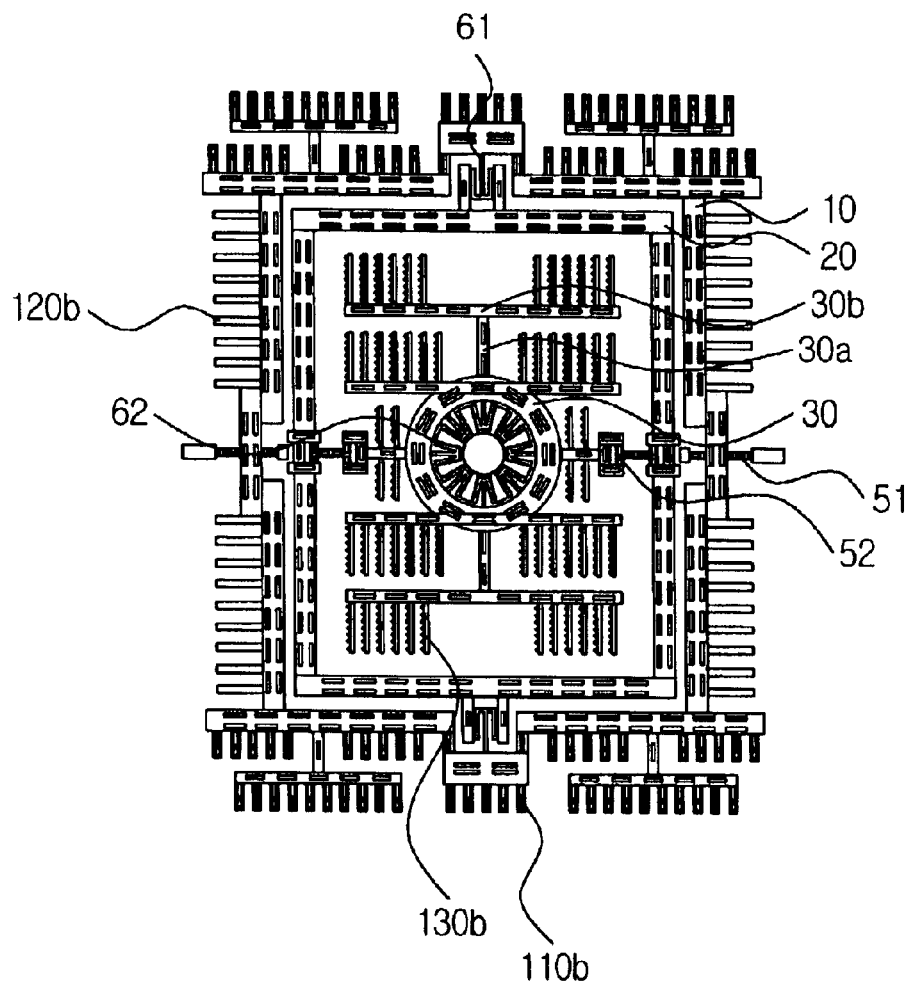
FIG. 4 illustrates the elements of FIG. 2 that are floating over the substrate.

FIG. 2 illustrates a view showing a MEMS gyroscope according to a preferred embodiment of the present invention. FIG. 3 illustrates a cross-sectional view of FIG. 2 taken along section line III—III. FIG. 4 illustrates the elements of FIG. 2 that are floating over the substrate.

A rotation-type MEMS gyroscope according to the present invention has a drive body 10 disposed on a substrate 100, a driving electrode 110 for driving the drive body 10, a drive-sensing electrode 120 for sensing a drive state of the drive body 10, a medium body 20 disposed inside the drive body 10, a sensing body 30 disposed inside the medium body 20, and a rotation-sensing electrode 130 for sensing a displacement of the sensing body 30. An insulation layer (100a of FIG. 3) is formed on the substrate 100. The drive body 10, medium body 20, and sensing body 30 are formed to float over a top of the insulation layer 100a.

Forming the drive body 10, the medium body 20 and the sensing body 30 in a floating state over the top of the insulation layer 100a requires a multi-step process. First, a sacrificial layer is formed over the top of the insulation layer 100a. Next, a layer on which the drive body 10, the medium body 20 and the sensing body 30 are to be formed is formed on the sacrificial layer. Then, the sacrificial layer is removed through etching. At this time, in order to effectively remove the sacrificial layer beneath the drive body 10, the medium body 20 and the sensing body 30 using an etching solution so that the drive body 10, the medium body 20 and the sensing body 30 float over the top of the insulation layer 100a, a plurality of etching holes 40 are formed in the drive body 10, the medium body 20 and the sensing body 30.

The drive body 10 has a substantially rectangular frame shape. A pair of fixing parts 12 for fixing the drive body 10 is formed on the substrate 100 and outside the drive body 10. The drive body 10 is connected to each of the fixing parts 12 by a pair of first torsion springs 51.

Figure 5A:
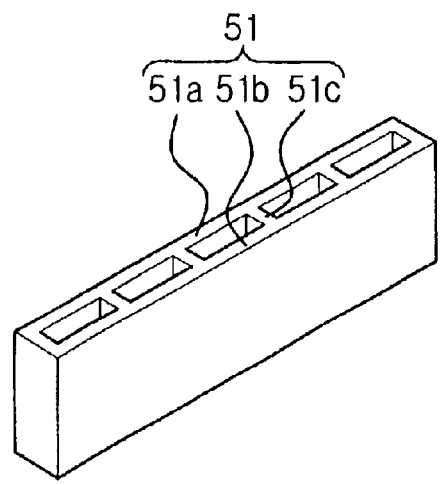
FIG. 5A illustrates an enlarged perspective view of a first torsion spring.

Each of the pair of first torsion springs 51, as shown in FIG. 5A, has a pair of parallel beams 51a and 51b. Each of the beams 51a and 51b are plate-shaped and are disposed on the substrate 100 in the normal direction. The beams 51a and 51b are connected to each other by a plurality of connection parts 51c. Therefore, the first torsion springs 51 each substantially have a shape of a vertically punched block. With such a structure, the first torsion springs 51 easily deform in torsion directions, but do not easily bend along their plate surface directions. Therefore, a ratio of bend strength to torsion strength increases as compared to a structure manufactured in a simple beam shape.

The first torsion springs 51 each having the structure shown in FIGS. 2 and 4 are disposed in the X-axis direction. Therefore, the drive body 10 is able to move relative to the substrate 100 about the X-axis and is fixed relative to the substrate 100 in the direction rotating about the Z-axis.

The medium body 20 has a substantially rectangular frame shape, and is disposed in a space inside the drive body 10. The drive body 10 and the medium body 20 are connected to each other by a pair of first bending springs 61.

Figure 6A:
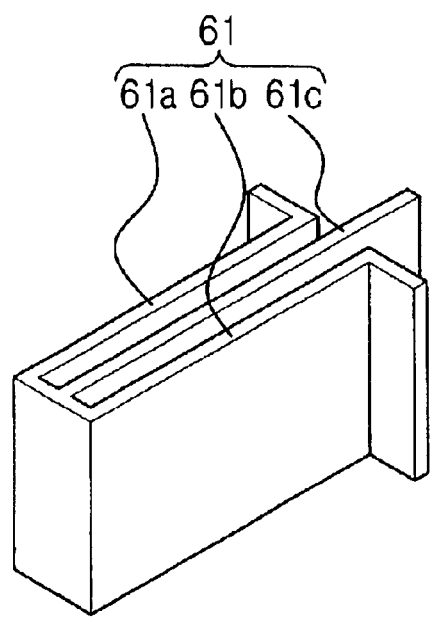
FIGS. 6A and 6B illustrate a perspective view and a top view, respectively, of a first bending spring.
Figure 6B:
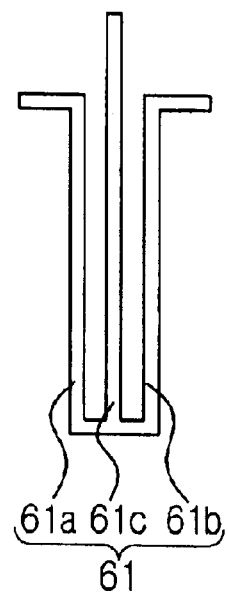

Each of the pair of first bending springs 61, as shown in FIGS. 6A and 6B, are formed of three plate-shaped beams 61a, 61b, and 61c, a portion of each being connected to one another. A central beam 61c of the beams 61a, 61b, and 61c is fixed to the drive body 10. Two side beams 61a and 61b are connected to the medium body 20. The beams 61a, 61b, and 61c are aligned with the Y-axis. With such a structure, the beams 61a, 61b, and 61c are bent by an external force applied in a rotational direction about the Z-axis. Therefore, by the first bending springs 61, the medium body 20 is rotatable relative to the drive body 10 about the Z-axis, and rotates together with the drive body 10 as the drive body 10 rotates about the X-axis.

The sensing body 30 has a ring shape. On a central part of the substrate 100 is formed a circular fixing part 32 for fixing the sensing body 30. The sensing body 30 is disposed around the outer periphery of the circular fixing part 32 to surround the circular fixing part 32. The outer periphery of the fixing part 32 is recessed to form a space in which second bending springs 62 are mounted. The second bending springs 62 connect the circular fixing part 32 and the sensing body 30.

Figure 7A:
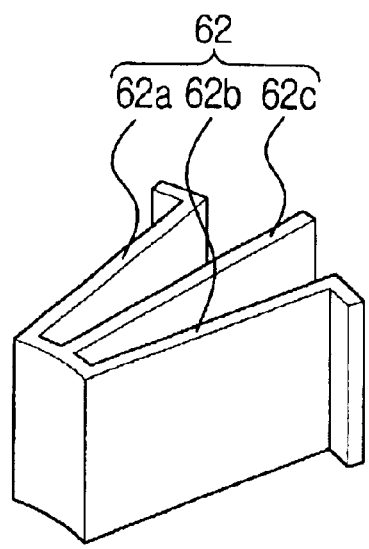
FIGS. 7A and 7B illustrate a perspective view and a top view, respectively, of a second bending spring.
Figure 7B:
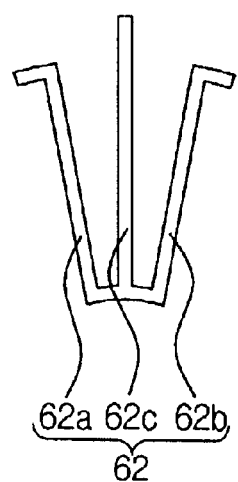

The second bending springs 62 have structures similar to the first bending springs 61. That is, as shown in FIGS. 7A and 7B, each of the second bending springs 62 have three plate-shaped beams 62a, 62b, and 62c, a portion of each being connected to another. The central beam 62c is connected to the sensing body 30. The side beams 62a and 62b are fixed to the fixing part 32. At this time, unlike FIGS. 6A and 6B, the side beams 62a and 62b are disposed at a certain angle not to be in parallel to one another but to form a rough circle. Such a structure comes from the consideration of rotations of the sensing body 30. The beams 62a, 62b, and 62c are disposed in a stand-up state on the substrate 100. With such a structure, the beams 62a, 62b, and 62c are bent by an external force applied in a rotation direction about the Z-axis. Therefore, by the second bending springs 62, the sensing body 30 becomes rotatable relative to the fixing part 32 about the Z-axis.

Figure 5B:
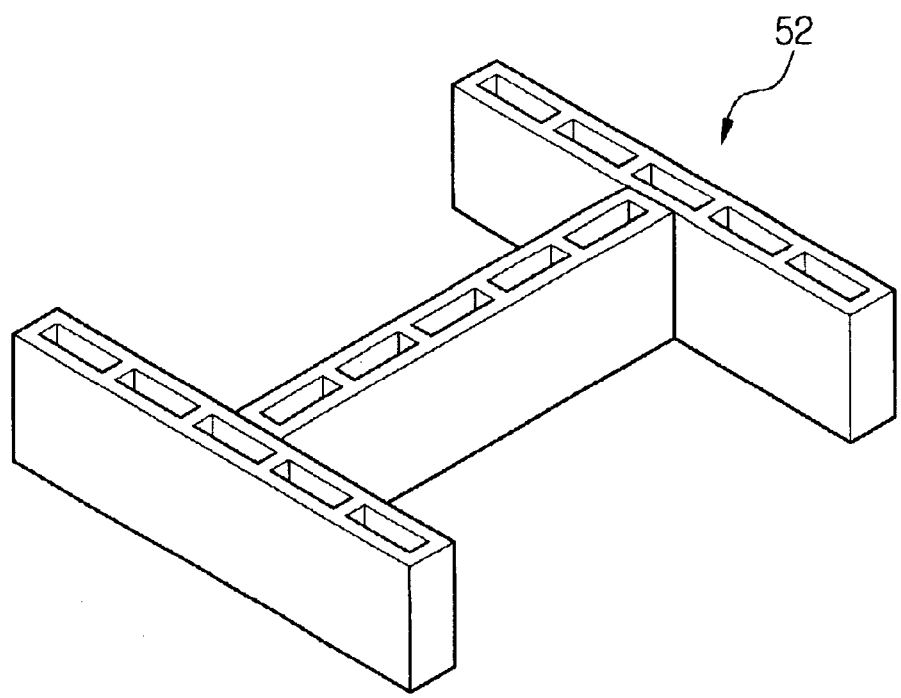
FIG. 5B illustrates an enlarged perspective view of a second torsion spring.

For a smooth elastic movement of the medium body 20 that simultaneously rotates about the X-axis and the Z-axis, a second torsion spring 52 has a combined structure of beams as shown in FIG. 5B, to cause a X-axis torsion and a Y-axis torsion simultaneously, where the beams for causing the Y-axis torsion are disposed at both ends of the beam for causing the X-axis torsion.

The driving electrode 110 is installed at sides of the drive body 10 in the direction of the Y-axis and is disposed on the same plane as the drive body 10. The driving electrode 110 is constructed with a fixed electrode 110a and a moving electrode 110b connected to each other in a comb structure. A drive terminal 115 for applying a voltage to the driving electrode 110 is formed on the substrate 100.

Figure 8A:
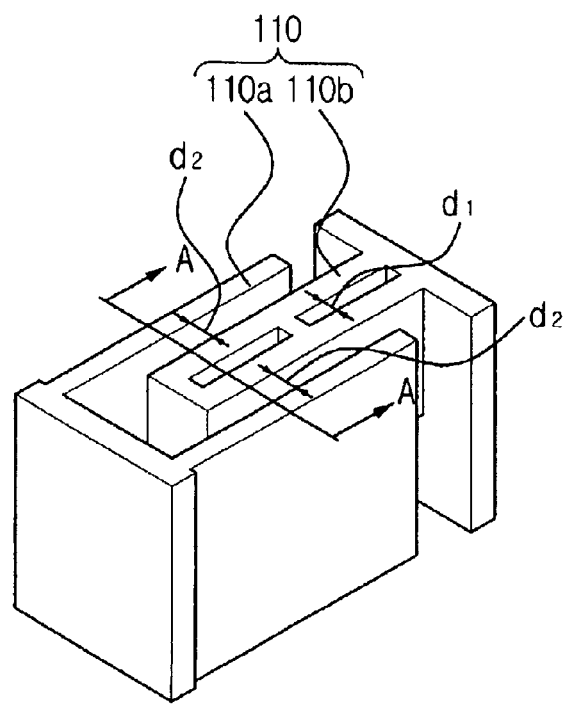
FIG. 8A illustrates a perspective view showing a structure of a driving electrode.
Figure 8B:
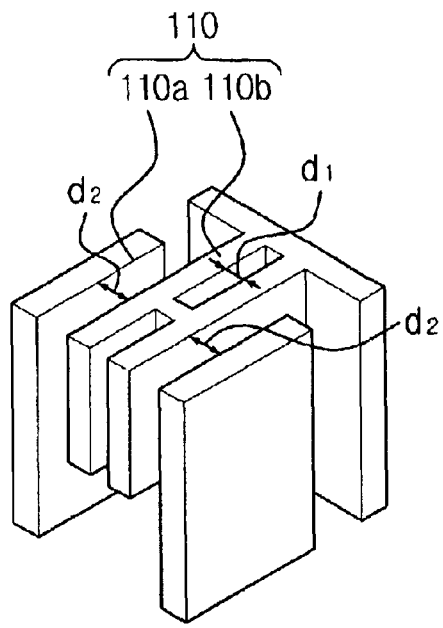
FIG. 8B illustrates a cross-sectional view showing a portion of FIG. 8A, taken along line A—A of FIG. 8A.

The fixed electrode 110a, as shown in FIGS. 8A and 8B, has a plurality of plate-shaped fixing walls fixed on the substrate 100. FIG. 8B illustrates a cross-sectional view taken at line A—A of FIG. 8A. The fixing walls are parallel and vertically disposed on the substrate 100. The moving electrode 110b has a plate-shaped moving wall connected to the drive body 10. Each moving wall is disposed in a space between the fixing walls.

Preferably, a height of the moving wall from the substrate 100 is less than a height of the fixing wall, and a lower portion of the moving wall is spaced apart from the substrate 100 by a predetermined distance. Accordingly, the moving electrode 110b becomes movable in the direction of the Z-axis on the substrate 100. As shown in FIG. 8A, etching holes are formed in the direction of the Z-axis. Further, a space between the moving electrode 110b and the fixed electrode 110a also acts as an etching hole. A width $d_1$ of the etching hole formed in the moving electrode 110b is smaller than a width $d_2$ between the moving electrode 110b and the fixed electrode 110a. The difference between $d_1$ and $d_2$ causes a difference of etching solution supplied through the etching holes so that the structures as shown in FIGS. 8A and 8B are formed in which the moving electrode 110b floats to be movable in the direction of the Z-axis on the substrate 100.

The drive-sensing electrode 120 is installed at sides of the drive body 10 in the direction of the X-axis. The drive-sensing electrode 120 is constructed with a fixed electrode 120a and a moving electrode 120b. The fixed electrode 120a is fixed on the substrate 100, and the moving electrode 120b is connected to the drive body 10. If the drive body 10 rotates about the X-axis, an interval between the moving electrode 120b and the fixed electrode 120a varies. On the substrate 100 is formed a drive-sensing terminal 125 to which a device is connected for sensing an electrostatic force varying with the changes of such an interval.

The driving electrode 110 and the drive-sensing electrode 120 are disposed along most of the outer sides of the drive body 10 having a rectangular frame shape. The drive terminal 115 and the drive-sensing terminal 125 are disposed at outer sides of the driving electrode 110 and the drive-sensing electrode 120 so that a gyroscope has an entirely rectangular shape. Therefore, in a case of manufacturing a plurality of gyroscopes on a single wafer, many gyroscopes may be manufactured without wasting space between gyroscopes.

The rotation-sensing electrode 130 is mounted in a space inside the medium body 20. The rotation-sensing electrode 130 has a fixed electrode 130a and a moving electrode 130b connected to each other in a comb structure, similar to the driving electrode 110. The fixed electrode 130a is connected to the substrate 100, and the moving electrode 130b is connected to the sensing body 30. On the inner space of the medium body 20, which is the central portion of the substrate 100, are formed rotation-sensing terminals 135 to which a device is connected for sensing an electrostatic force that varies with changes in a potential of the rotation-sensing electrode 130.

The sensing body 30 has a vertical beam 30a that extends in the direction of the Y-axis on the substrate 100 and a plurality of horizontal beams 30b that extend in the direction of the X-axis. The moving electrode 130b is connected to the horizontal beams 30b. With this arrangement of the horizontal beams 30, the sensing body 30 may be formed in nearly all of the space inside the medium body 30 of a rectangular frame shape, so all of the area of the substrate 100 may be effectively utilized without wasting space on the substrate 100.

The fixed electrode 130a has a substantially zigzag-shaped side. The moving electrode 130b has a shape corresponding to the zigzag-shaped side of the fixed electrode 130a. The mutual connection structure of such a zigzag-shape prevents a distance between the moving electrode 130b and the fixed electrode 130a from increasing at points increasingly farther out in a radial direction from the center of the sensing body 30 as the sensing body 30 rotates.

Figure 9A:
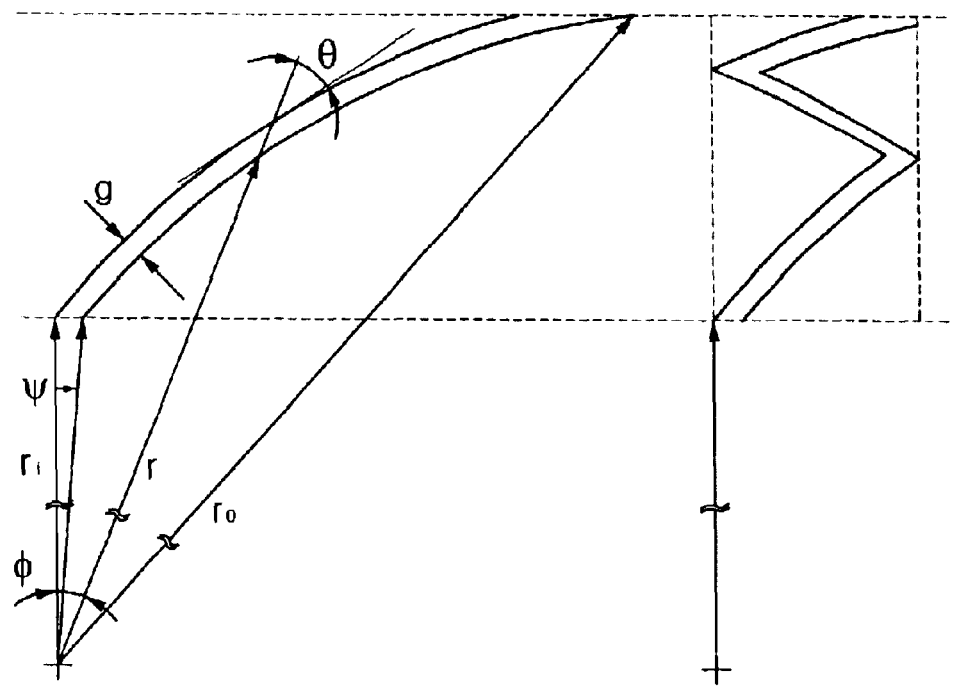
FIGS. 9A to 9C illustrate views showing a structure of a sensing electrode.
Figure 9B:
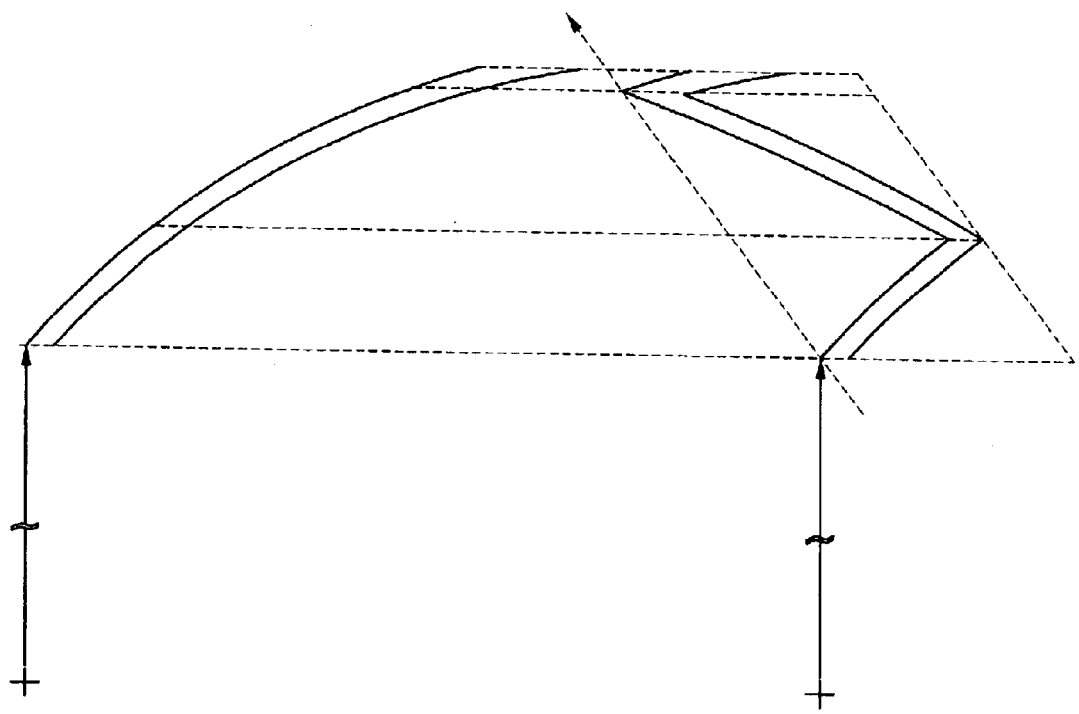
Figure 9C:
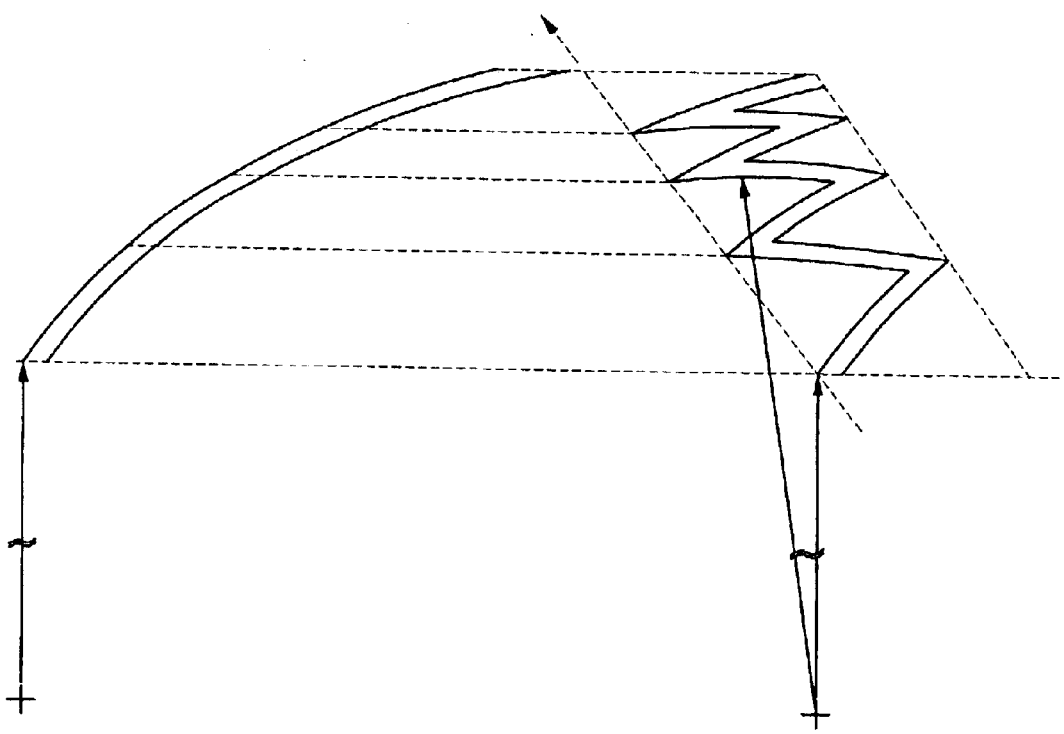

FIGS. 9A to 9C illustrate various examples of a zigzag shape for use in the above-described sensing electrode 130.

The moving electrode 130b is disposed to maintain a predetermined distance from the fixed electrode 130a. This predetermined distance varies when the moving electrode 130b moves closer to or farther away from the fixed electrode 130a. At this time, although the distance between the fixed electrode 130a and the moving electrode 130b becomes smaller or larger as the moving electrode 130b moves, the distance between the moving electrode 130b and the fixed electrode 130a is substantially uniform at each respective point along the sides of the moving electrode 130b and the fixed electrode 130a for the entire length of the respective sides. For this, the mutually contacting sides of the fixed electrode 130a and the moving electrode 130b are disposed along a curve spaced apart in a predetermined curvature relative to a radial direction of the rotation-sensing electrode 130. Therefore, the space between the moving electrode 130b and the fixed electrode 130a does not increase at points along the sides of the moving electrode 130b and the fixed electrode 130a that are increasingly farther away from the center of the sensing body 30 as the sensing body rotates.

When a tangential angle at a portion at which the fixed electrode 130a and the moving electrode 130b are tangential is defined as θ, the angle θ may be defined by equation 1 below:

$$\theta = \cos^{-1}\left(\frac{g}{\gamma\psi}\right) \quad (1)$$

wherein γ denotes a distance from the rotation center of the rotation-sensing electrode 130 to a position at which the tangential angle θ is obtained, g denotes a minimum distance capable of being manufactured between the fixed electrode 130a and the moving electrode 130b, and ψ denotes an angle between the fixed electrode 130a and the moving electrode 130b. Further, when $r_i$ denotes the radius from the rotation center of the rotation-sensing electrode 130 to the innermost side of the fixed electrode 130a and the moving electrode 130b, and r denotes an electrode position radius from the rotation center of the rotation-sensing electrode 130 to a position at which the tangential angle θ is obtained, an electrode position angle φ, which is an angle formed by a straight line in the $r_i$ direction from the rotation center and a straight line in the r direction from the rotation center, may be defined by equation 2 below:

$$\phi = \int_{r_i}^{r} \tan\frac{\theta}{r} dr \quad (2)$$

Additionally, in FIG. 9A, $r_0$ denotes a radius from the rotation center of the rotation-sensing electrode 130 to the outermost side of the fixed electrode 130a and the moving electrode 130b.

By forming the mutually opposite sides of the moving electrode 130b and the fixed electrode 130a to have the above tangential angle θ, a distance between the moving electrode 130b and the fixed electrode 130a is evenly maintained when the moving electrode 130b becomes closer to or is spaced farther apart from the fixed electrode 130a.

Hereinafter, operation of a MEMS gyroscope having the above structure according to an embodiment of the present invention will be described.

Figure 10:
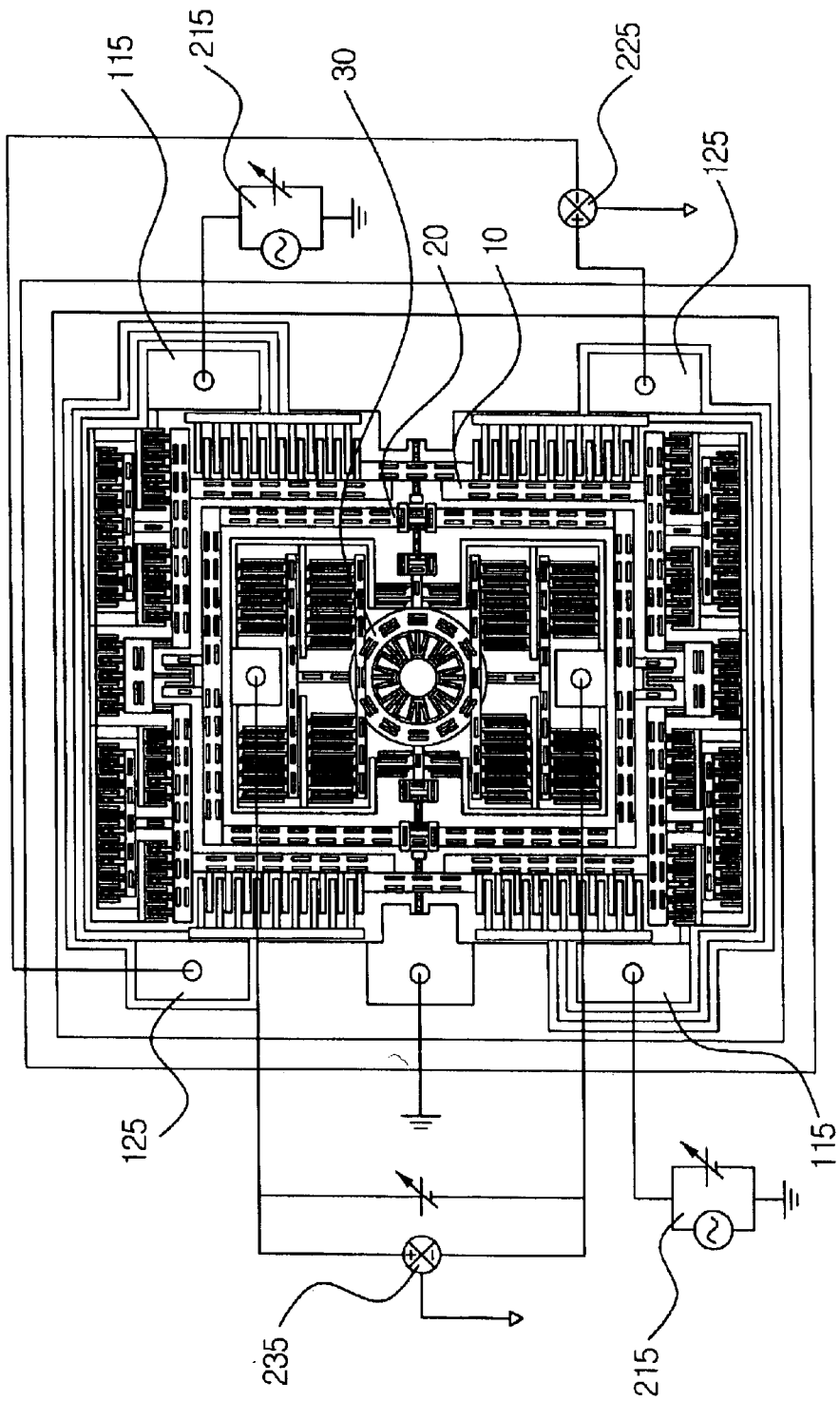
FIG. 10 illustrates a view showing how voltage is applied to the rotation-type MEMS gyroscope shown in FIG. 2.

As shown in FIG. 10, a time-varying voltage is applied to the driving electrode 110 from a drive voltage supply 215 connected to the drive terminals 115. It is desirable to match the frequency of the voltage applied to the driving electrode 110 with a natural frequency of the drive body 10 in order to maximize a drive force and to increase a drive efficiency. Further, it is desirable to design the sensing motion of the sensing body 30 to be generated at a frequency similar to the natural frequency of the drive body 10.

When considering a manufacturing tolerance, in order for the sensing body 30 to perform the sensing motion thereof at a value near the natural frequency of the drive body 10, it is desirable to decreasingly regulate the frequency of the sensing motion by applying a tuning voltage between the fixed electrode 130a and the moving electrode 130b of the rotation-sensing electrode 130. Simultaneously, it is desirable to use the tuning voltage as a voltage for measuring the variation of the capacitance of the rotation-sensing electrode 130 upon the sensing motion of the sensing body 30.

A drive-sensing device 225 and a rotation-sensing device 235 are connected to the drive-sensing terminals 125 of the drive-sensing electrode 120 and the rotation-sensing terminals 135 of the rotation-sensing electrode 130 respectively. The drive-sensing device 225 and the rotation-sensing device 235 sense the variations of the electrostatic forces between the respective fixed electrodes 120a and 130a and moving electrodes 120b and 130b.

The fixed electrode 120a of the drive-sensing electrode 120, the fixed electrode 130a of the rotation-sensing electrode 130, the first torsion springs 51, the first bending springs 61, and the fixing parts 12 are connected by a common electrode pad and are electrically grounded.

Figure 11:
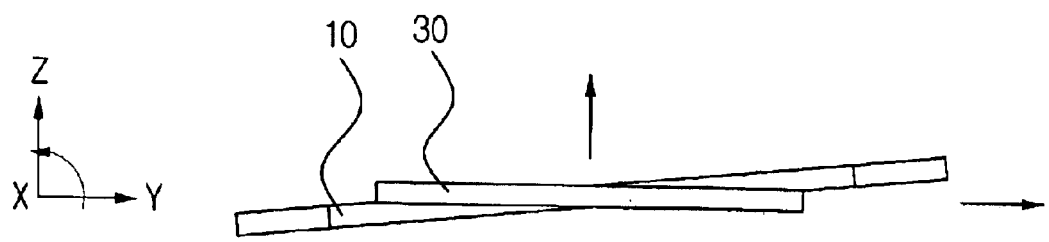
FIG. 11 illustrates a schematic side view for partially showing FIG. 2 that shows a drive body-driven state.

Referring now to FIG. 11, if a voltage is applied to the driving electrode 110, the drive body 10 rotates about the X-axis by an electrostatic force generated by the driving electrode 110. The rotation direction of the drive body 10 varies according to the polarity changes of the voltage applied to the driving electrode 110. Accordingly, the drive body 10 rotates about the X-axis. The drive body 10 is able to move about the X-axis since the drive body 10 is fixed to the fixing part 12 by the first torsion springs 51. Further, since the medium body 20 is fixed relative to the drive body 10 in the Z-axis by the first bending springs 61, the medium body 20 rotates about the X-axis together with the drive body 10.

The sensing body 30 is connected to rotate relative to the medium body 20 about the X-axis by the second torsion springs 52. The sensing body 30 can move only in the direction rotating about the Z-axis by the second bending springs 62, so the sensing body 30 is maintained in a stationary state while the medium body 20 moves together with the drive body 10.

The drive-sensing device 225 connected to the drive-sensing electrode 120 measures a displacement rotated about the X-axis of the drive body 10, and a measured value is provided to a controller (not shown). The controller controls an electric field applied to the driving electrode 110 in order for the drive body 10 to effectively vibrate about the X-axis based on the measured value of the drive-sensing device 225.

If an angular velocity of the direction rotating about the Y-axis is applied to the gyroscope while the drive body 10 and the medium body 20 are vibrating, a Coriolis force is applied to the drive body 10 and the medium body 20 in the direction rotating about the Z-axis. The drive body 10 is fixed to the substrate 100 in the direction rotating about the Z-axis by the first torsion springs 51, and the medium body 20 can rotate relative to the drive body 10 about the Z-axis by the first bending springs 61. Therefore, if the Coriolis force is applied, the medium body 20 rotates about the Z-axis as shown in FIG. 12.

Figure 12:
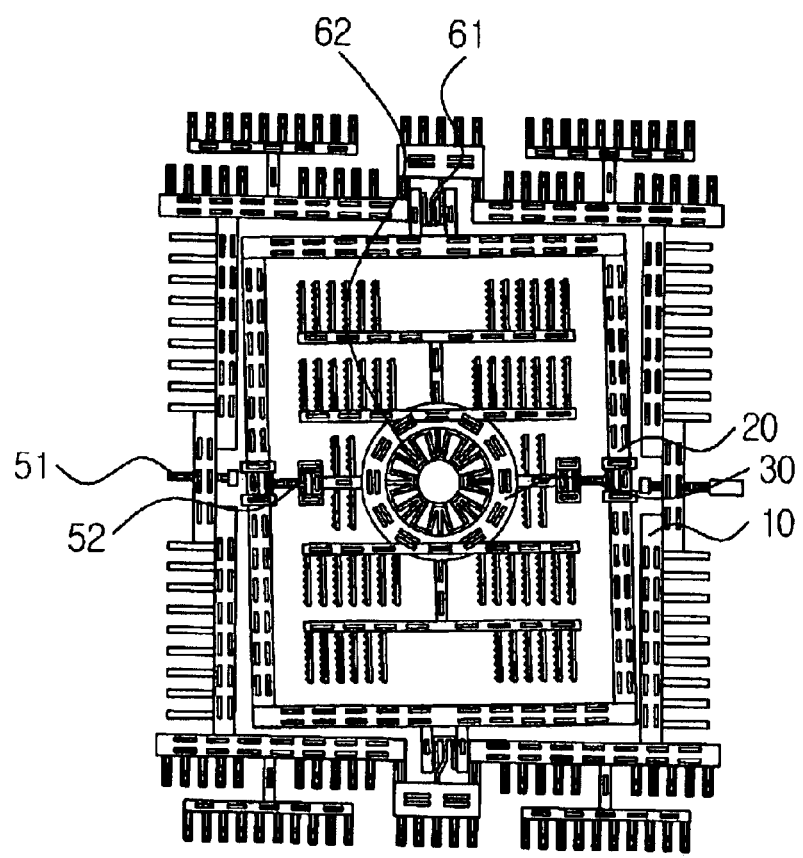
FIG. 12 illustrates a view showing a MEMS gyroscope according to an embodiment of the present invention in a state of being deformed by the Coriolis force.

If the medium body 20 rotates, the sensing body 30 rotates together with the medium body 20, as shown in FIG. 12, since the medium body 20 and the sensing body 30 are connected by the second torsion springs 52 deformed in a torsion direction. At this time, a distance between the fixed electrode 130a and the moving electrode 130b inside the rotation-sensing electrode 130 varies, and, according to the distance variation, a variation of the capacitance of the rotation-sensing electrode 130 is generated. The rotation-sensing device 235 measures the variation of the capacitance, and the controller uses the variation of the capacitance of the rotation-sensing electrode 130 to calculate an angular velocity by an external force applied in a direction rotating about the Y-axis.

With the present invention, when the drive body 10 moves, the medium body 20 moves, but the sensing body 30 remains still, and, when the Coriolis force is generated, the sensing body 30 rotates if the medium body 20 rotates. More specifically, the drive body 10 moves only in a driving direction, and the sensing body 30 moves only in a sensing direction, so both the drive body 10 and the sensing body 30 have a decoupled structure. Accordingly, the angular velocity-sensing performance of the gyroscope is enhanced.

Further, the motion about the X-axis of the drive body 10 is regulated by the driving electrode 110 having the fixed electrode 110a and the moving electrode 110b formed on the same plane. Accordingly, the manufacturing process becomes simplified since the driving electrode 110 may be manufactured together in the same process upon carrying out processes of manufacturing other parts inside the gyroscope.

Further, a distance between the moving electrode 130b and the fixed electrode 130a inside the rotation-sensing electrode 130 is constantly maintained while the moving electrode 130b moves, so the sensing performance of the rotation-sensing electrode 130 is enhanced.

In addition, with the present invention, the drive body 10 and medium body 20 are disposed in a rectangular frame shape and the respective electrodes are disposed at outer sides thereof, so the entire shape of the gyroscope is formed in a rectangle. Accordingly, wasted space between gyroscopes is avoided during the manufacture of a plurality of gyroscopes on a single wafer, thereby enhancing the space efficiency of a wafer.

Furthermore, if the gyroscope of the present invention is disposed in a rotation of 90° with respect to the Z-axis, an input angular velocity may be measured in a direction rotating about the X-axis, so that two-axis gyroscopes may be manufactured using the same mask on the same substrate using the same method. Additionally, two-axis gyroscopes having advantages of the same sensitivity, same signal processing parts, same chip size, and other similarities may be manufactured. In addition, in a case where such gyroscopes are manufactured together with a gyroscope sensing an input angular velocity with respect to the vertical direction, three-axis gyroscopes may be manufactured.

A preferred embodiment of the present invention has been disclosed herein and, although specific terms are employed, they are used and are to be interpreted in a generic and descriptive sense only and not for purpose of limitation.

Accordingly, it will be understood by those of ordinary skill in the art that various changes in form and details may be made without departing from the spirit and scope of the present invention as set forth in the following claims.

What is claimed is:

1. A MEMS gyroscope, comprising:
   a drive body disposed on a substrate to be movable about a first axis, the first axis being a rotation axis line parallel to a surface of the substrate;
   a sensing body disposed on the substrate to be movable about a second axis, the second axis being a rotation axis line normal to the surface of the substrate;
   a medium body disposed on the substrate, the medium body being capable of moving together with the drive body about the first axis and moving together with the sensing body about the second axis;
   a driving electrode for driving the drive body in order for the drive body to vibrate in a certain range about the first axis; and
   a sensing electrode for measuring a displacement of the sensing body rotating about the second axis by a Coriolis force generated by an application of an angular velocity while the drive body vibrates by the driving electrode.

2. The MEMS gyroscope as claimed in claim 1, further comprising:
   a first torsion spring for fixing the drive body to the substrate, the first torsion spring being torsion-deformed in order for the drive body to rotate relative to the substrate about the first axis;
   a first bending spring for fixing the medium body to the drive body, the first bending spring being bending-deformed in order for the medium body to rotate relative to the drive body about the second axis;
   a second torsion spring for fixing the medium body to the sensing body, the second torsion spring being torsion-deformed in order for the medium body to rotate relative to the sensing body about the first axis; and
   a second bending spring for fixing the sensing body to the substrate, the second bending spring being bending-deformed in order for the sensing body to rotate relative to the substrate about the second axis.

3. The MEMS gyroscope as claimed in claim 2, wherein at least either the first torsion spring or the second torsion spring comprises:
   a pair of plate-shaped beams disposed parallel to each other; and
   a plurality of connection parts connecting the beams.

4. The MEMS gyroscope as claimed in claim 2, wherein the second torsion spring comprises:
   a first beam for being torsion-deformed with respect to the first axis; and
   a second beam vertically connected to both ends of the first beam, for being torsion-deformed with respect to a third axis, the third axis being a rotation axis parallel to the surface of the substrate and perpendicular to the first axis.

5. The MEMS gyroscope as claimed in claim 2, wherein at least either of the first bending spring or the second bending spring comprises a plurality of plate-shaped beams fixed to one another at a portion thereof.

6. The MEMS gyroscope as claimed in claim 1, wherein the driving electrode is formed in a comb structure.

7. The MEMS gyroscope as claimed in claim 5, wherein the driving electrode comprises:
   a fixed electrode having a plurality of fixing walls vertically disposed on the substrate, formed in parallel to one another, and fixed to the substrate; and
   a moving electrode disposed between two of the plurality of fixing walls, having a plurality of moving walls having a height less than a height of the plurality of fixing walls from the substrate, the moving electrode being connected to the drive body.

8. The MEMS gyroscope as claimed in claim 1, wherein the sensing electrode comprises:
   a fixed electrode connected to the substrate and having zigzag-shaped sides; and
   a moving electrode connected to the sensing body and having a zigzag shape corresponding to the shape of the sides of the fixed electrode.

9. The MEMS gyroscope as claimed in claim 7, wherein as the moving electrode moves in relation to the fixed electrode, a distance between the moving electrode and the fixed electrode varies substantially uniformly at respective points over an entire length of the sides of the moving electrode and the fixed electrode, such that a distance between respective points along the length of the sides of the moving electrode and the fixed electrode is substantially uniform for any distance, and wherein the shape of the sides is expressed in formulae as below:

$$\theta = \cos^{-1}\left(\frac{g}{r\psi}\right)$$

$$\Phi = \int_{r_i}^{r} \tan\frac{\theta}{r} dr$$

wherein $\theta$ denotes a tangential angle at a portion at which the fixed electrode and the moving electrode meet, r denotes a distance from a rotation center of the sensing electrode to a position at which the tangential angle $\theta$ is obtained, g denotes a minimum distance manufacturable between the fixed electrode and the moving electrode, $\Psi$ denotes an angle between the fixed electrode and the moving electrode, $r_i$ denotes a radius from the rotation center of the sensing electrode to an innermost side of the fixed electrode and the moving electrode, r denotes an electrode position radius from the rotation center of the sensing electrode to a position at which the tangential angle $\theta$ is calculated, and $\phi$ denotes an electrode position angle formed by a straight line in the $r_i$ direction from the rotation center of the sensing electrode and a straight line in the r direction from the rotation center of the sensing electrode.

10. The MEMS gyroscope as claimed in claim 1, wherein the drive body and the medium body have a substantially rectangular frame shape.

11. The MEMS gyroscope as claimed in claim 1, wherein the sensing body has a ring shape.

12. The MEMS gyroscope as claimed in claim 9, wherein the medium body is disposed in a space inside the drive body, and the sensing body is disposed in a space inside the medium body.

13. The MEMS gyroscope as claimed in claim 1, wherein a plurality of etching holes are formed in the drive body, medium body, and sensing body.

14. The MEMS gyroscope as claimed in claim 2, wherein the fixed electrode of the sensing electrode, the first torsion spring, and the first bending spring are connected by a common electrode pad and are electrically grounded.

* * * * *